United States Patent [19]

Long, Jr. et al.

[11] Patent Number: 4,936,983
[45] Date of Patent: Jun. 26, 1990

[54] SEWAGE SLUDGE TREATMENT WITH GAS INJECTION

[75] Inventors: Charles A. Long, Jr.; Philip M. Grover, both of Birmingham, Ala.

[73] Assignee: Long Enterprises, Inc., Birmingham, Ala.

[21] Appl. No.: 402,276

[22] Filed: Sep. 1, 1989

[51] Int. Cl.⁵ .................................................. C02F 11/06
[52] U.S. Cl. .................................... 210/218; 210/219; 261/89
[58] Field of Search ............... 210/208, 603, 218–220, 210/244; 261/84, 87–89

[56] References Cited

U.S. PATENT DOCUMENTS

| | | | |
|---|---|---|---|
| 888,090 | 5/1908 | Kestner | 210/760 |
| 1,790,975 | 2/1931 | Dallas et al. | 210/760 |
| 3,271,304 | 9/1966 | Valdespino et al. | 210/15 |
| 3,650,950 | 3/1972 | White | 210/197 X |
| 3,772,188 | 11/1973 | Edwards | 210/197 X |
| 3,945,922 | 3/1976 | Jagusch et al. | 210/218 X |
| 3,965,009 | 6/1976 | Kaelin | 210/218 |
| 4,021,349 | 5/1977 | Kaelin | 210/219 |
| 4,267,052 | 5/1981 | Chang | 210/208 X |
| 4,412,003 | 10/1983 | Evans | 210/218 X |
| 4,487,699 | 12/1984 | Long, Jr. | 210/760 |
| 4,582,612 | 4/1986 | Long, Jr. | 210/760 |
| 4,652,382 | 3/1987 | Edwards | 210/219 X |
| 4,659,464 | 4/1987 | Long, Jr. | 210/221.1 |
| 4,695,388 | 9/1987 | Long, Jr. | 210/760 |

Primary Examiner—Tom Wyse
Attorney, Agent, or Firm—Panitch Schwarze Jacobs & Nadel

[57] ABSTRACT

This invention relates to apparatus for treating sewage sludge in a hyperbaric vessel in which the sludge is oxygenated by injecting an oxygen-rich gas into the sewage sludge and then dispersing the mixture of sludge and oxygen-rich gas into the upper portion of a hyperbaric vessel for further interaction with an oxygen-rich atmosphere. The oxygen-rich gas is injected into the sewage sludge by delivering the gas to a combination gas and sludge mixing and dispersing assembly. The gas and sludge are mixed within a plurality of channels formed in the assembly before the mixture is dispersed from the channels.

9 Claims, 4 Drawing Sheets

SEWAGE SLUDGE TREATMENT WITH GAS INJECTION

BACKGROUND OF THE INVENTION

This invention relates to apparatus for treating sewage sludge in a hyperbaric vessel in which the sludge is oxygenated by injecting an oxygen-rich gas into the sewage sludge and then dispersing the mixture of sludge and oxygen-rich gas into the upper portion of a hyperbaric vessel for further interaction with an oxygen-rich atmosphere.

Traditionally, sewage, and specifically sludge, has been difficult to treat because it is, almost by definition, extremely variable in composition. In addition to human liquid and solid organic waste, the sludge to be treated in accordance with the present invention may include industrial and commercial sludge which is susceptible to aerobic treatment. In general, the present invention provides a means and process for highly efficient interaction of sludge particles with an oxygen-rich gas, in the form of $O_2$ gas (oxygen) and/or $O_3$ gas (ozone).

The present invention is intended primarily for treatment of activated sludge, namely, waste from domestic, commercial and industrial sources which create a biologically degradable material. A batch of pH adjusted waste to be treated is mixed with an oxygen-rich gas, the mixture is divided into small droplets and the droplets are dispersed within a pressure vessel where they are oxygenated by being exposed to an oxygen-rich gas for a substantial period of time. The Biological Oxygen Demand (BOD) and the Chemical Oxygen Demand (COD) of the waste are substantially saturated and satisfied. The addition of ozone produces an almost complete destruction and elimination of coliform, fecal coliform, salmonella and other harmful bacteria from the batch of sludge being treated. Although the coliform and fecal coliform bacteria are not in themselves particularly harmful, when they are present, it is recognized that other harmful bacteria are present. Thus, when the coliform and fecal coliform bacteria are destroyed, it is an indication that the other harmful bacteria, which are more difficult to detect, are also destroyed.

The present invention is intended to be used in a large scale sewage treatment system for treating activated sludge which is generally too thick to be treated efficiently on a large scale basis by presently existing commercial equipment. The present invention can be incorporated with presently existing wastewater treatment plants. Most existing wastewater treatment plants are capable of producing sludge with a solid content of about one and one-half percent by weight. The present invention has been designed to treat sludge having a solid content of greater than four percent to about six percent by weight, more preferably from about five percent to about six percent. The apparatus is believed to be most cost effective with sludge having solids content of about five and one-half percent to six percent by weight.

Various prior art references have dealt with treating sewage or water by aeration, oxidation or ozonation, as well as with dispersment in hyperbaric vessels. None, however, has all of the features of the present invention.

In U.S. Pat. No. 888,090 of Kestner, a centrifugal fan mixes and atomizes water and air using a centrifugal fan to purify the water. Water is fed coaxially within an air pipe which is mounted at the inlet end of a centrifugal fan so that the water and air are atomized by the fan.

U.S. Pat. No. 1,790,975 of Dallas et al. discloses a method and apparatus for treating sewage by the activated sludge process in which an air lift for circulating liquid in sewage treatment chambers are mixed as the air and sewage rises in a pipe to a distributor head which showers or sprays the liquid over the surface of the liquid in the chamber.

U.S. Pat. No. 3,271,304 of Valdespino et al. discloses mixing liquid sewage to be treated with pressurized air in a venturi-type aspirator in an open top treatment vessel. The venturi aspirator mixing device is located near the bottom of the treatment vessel substantially below the surface of the liquid being treated.

U.S. Pat. No. 3,650,950 of White discloses a device for treatment of waste materials in which various types of shearing rotors subject the liquid material to shearing stresses simultaneously with the injection of an oxidizing agent, such as ozone, to enhance biochemical and chemical treatment of the material, as well as to physically treat the material.

U.S. Pat. No. 3,772,188 of Edwards discloses a sewage and sludge treatment apparatus and process in which oxygen and ozone are bubbled through the material in a lower portion of a treatment vessel which may be a hyperbaric vessel. The oxygenated material is then pumped through a pipe against a distributor which distributes the treated material throughout an upper portion of the vessel for further contact with the oxygen-rich atmosphere.

Despite the disclosure in the above-identified patents of water, sewage or sludge treatment systems, a need existed in the sludge treatment industry for systems which more efficiently and completely oxygenated sludge of various compositions. This led one of the co-inventors of the present invention to develop a series of improved sludge treatment systems as illustrated, described and claimed in U.S. Pat. Nos. 4,487,699, 4,582,612, 4,659,464 and 4,695,388 of Charles A. Long, Jr., the disclosures of which are hereby incorporated by reference. While the sludge treating systems, processes and apparatus disclosed in the foregoing Long, Jr. patents enhanced the treatment of sludge compared to the systems, processes and apparatus previously known for that purpose, the present inventors devised a way to still further enhance the treatment of sewage sludge to reduce the bacteria in the treated sludge to below currently detectable levels in a relatively short time and in an efficient manner.

The present invention preferably is used with the same general types of systems used in the processes and apparatus disclosed in the foregoing Long, Jr. patents. Therefore, only the components of the overall system or reactor which are necessary to understand the present invention will be described herein.

By initially injecting oxygen or ozone gas into the sludge prior to dispersing the sludge in the form of several streams of divided drops, droplets or particles in a pressurized, oxygen-rich atmosphere through a plurality of channels formed in a combination gas and sludge mixing and dispersing means, more efficient and complete bacterial kill, oxygenation and activation of the sludge is obtained. The initial contact of the sludge with the pressurized oxygen-rich gas, and particularly ozone, into the separated stream of sludge within the channels of the combination gas and sludge mixing and dispersing assembly creates an intimate, immediate contact of a relatively high concentration of the oxygen-rich gas with the sludge to enhance the oxidation of the sludge. When the mixture is dispersed in the form of droplets or the like from the combination mixing and dispersing apparatus in a plurality of streams into the upper portion for interaction with the pressurized oxygen-rich gas, the previously oxygenated sludge is even further activated as the sludge is dispersed throughout the upper portion of the hyperbaric vessel.

SUMMARY OF THE INVENTION

The present invention relates to an apparatus for use in a sewage treatment system comprising means to enhance the treatment of the sludge with oxygen-rich gas including a hyperbaric vessel having sludge inlet means for conveying the sludge to the vessel to be accumulated in a lower portion thereof, a combination mixing and dispersing means supported within an upper portion of the vessel for mixing the sludge and oxygen-rich gas and for dispersing a mixture of sludge and oxygen-rich gas throughout the upper portion of the vessel, the combination mixing and dispersing means comprising a first, lower section and a second, upper section, and having a plurality of channels radially arranged therethrough and extending from and between the first section and through and between the second section of the combination mixing and dispersing means, a sludge delivery means attached to the first section of the combination mixing and dispersing means for delivering sludge from the bottom portion of the vessel to the mixing and dispersing means, a gas delivery means for delivering oxygen-rich gas to the first section of the combination mixing and dispersing means, the gas delivery means having a plurality of conduits each in fluid communication with one of the channels, a sludge outlet means for removing the oxygenated sludge from the lower portion of the vessel, and gas outlet means for removing gas from the upper portion of the vessel.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

DETAILED DESCRIPTION OF THE PREFERRED EMBODIMENTS

Figure 1:
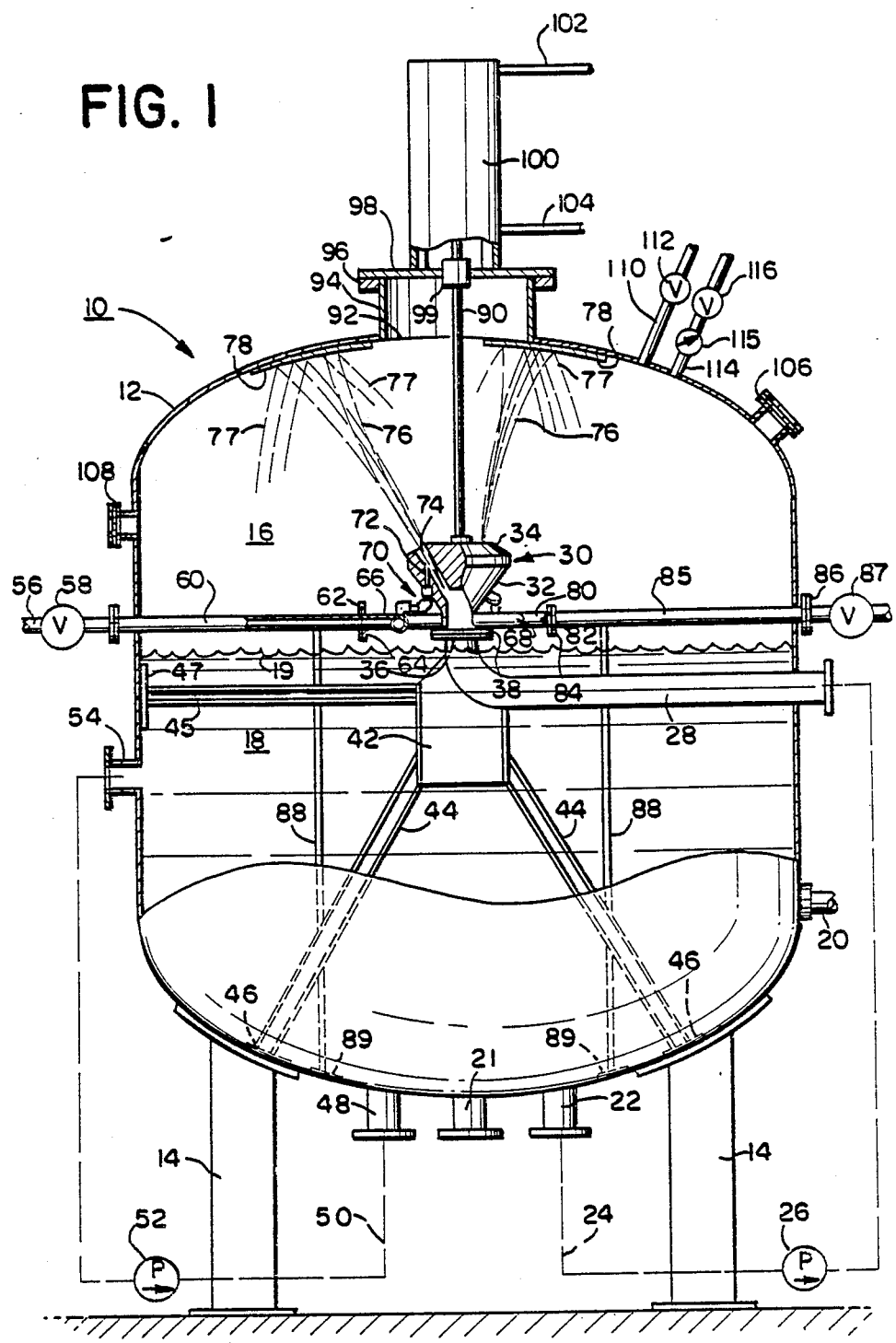
FIG. 1 is a vertical cross-sectional view, partly in side elevation, of a reactor assembly and related components in accordance with the present invention.

Referring to the drawings in detail, wherein like numerals indicate like elements throughout the several views, there is shown in FIG. 1 a reactor assembly 10 including related components in accordance with the present invention. Reactor assembly 10 comprises a hyperbaric vessel 12 supported above a foundation of any suitable type and strength by a plurality of support members 14. Although the vessel 12 is typically of such size that it is best adapted to be mounted in a stationary manner as part of a stationary sewage treatment system, if desired, vessel 12 may be mounted on a trailer or other transport device by which it may be transported to various locations to be connected to other components of a sewage treatment system. Although vessel 12 may be of any desired size, it is preferred that it be capable of handling a large volume of sludge and would have typical dimensions of about 12 feet in diameter and about 16 feet in height. Although the vessel is generally illustrated as being generally cylindrical with rounded edges where the sides meet the top and bottom walls, it may have other shapes, if desired. The vessel should be able to withstand pressures of at least about six atmospheres, since the vessel will be operated primarily under hyperbaric conditions, that is, above atmospheric pressure. The material used to make the vessel should be durable, as well as easy to maintain and non-reactive with the acidified sludge environment. A suitable material would be stainless steel, for example.

Vessel 12 has an upper portion 16 and a lower portion 18. Lower portion 18 includes any portion of the vessel containing sludge and is not limited to any particular volume of sludge within the vessel. It is important that there be an upper portion 16 located above the level of sludge 19 and above the level of a sludge mixing inlet 54. Accordingly, upper portion 16 of the vessel is not defined by any specific volume but should be sufficient to contain the combination gas and sludge mixing and dispersing assembly 30 and have sufficient volume to allow substantially complete interaction between the dispersed sludge and oxygen-rich gas in the upper portion.

Sludge, preferably having its pH adjusted to about 3 to about 4.5 is pumped into lower portion 18 of vessel 12 through a sludge inlet 20. When the sludge is fully oxygenated, the sludge exits vessel 12 through a sludge outlet 21. Sludge inlet 20 and outlet 21 may be connected to valved conduits where the valves are operated by remote control as is well known to those skilled in the art.

Sludge is delivered from lower portion 18 to upper portion 16 of vessel 12 by a sludge delivery means. The sludge delivery means comprises a sludge recirculating outlet 22 attached in a suitable manner, such as by a flanged connection, to a conduit 24. A pump 26, such as a hydraulically driven pump, pumps sludge through conduit 24 into a sludge delivery conduit 28 which is attached as set forth hereinafter to the combination gas and sludge mixing and dispersing assembly 30.

Figure 2:
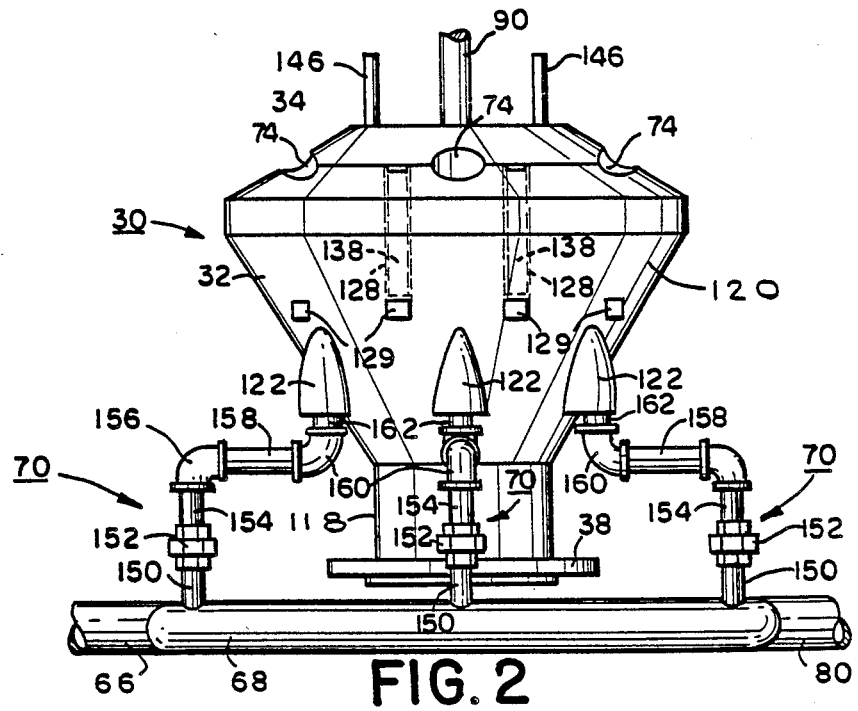
FIG. 2 is a side elevation view of a combination gas and sludge mixing and distributing assembly which is one of the components of the reactor assembly showing its connection to the oxygen-rich gas delivery means.
Figure 4:
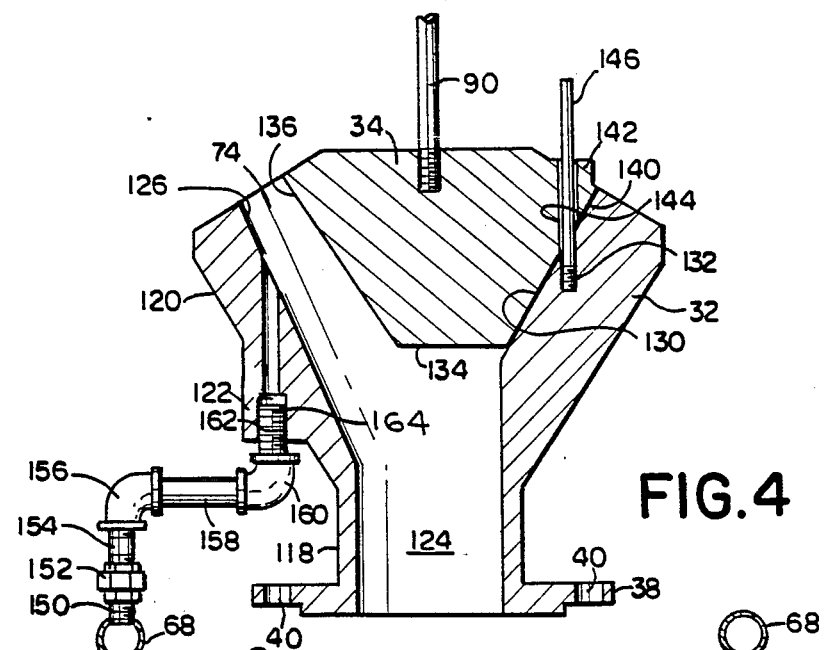
FIG. 4 is a vertical cross-sectional view, partly in elevation, taken along lines 4—4 of FIG. 3.
Figure 5:
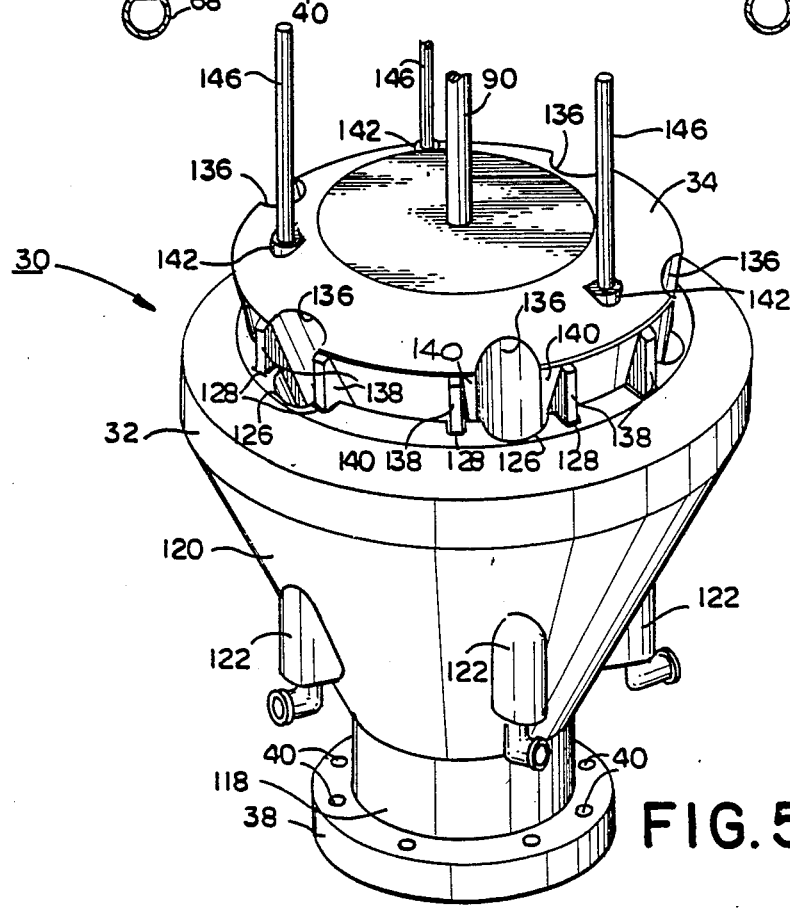
FIG. 5 is a perspective view of the combination gas and sludge mixing and dispersing assembly showing the construction of the assembly having an interrelationship between a first, lower section or subassembly and a second, upper section or subassembly, in which the second section is raised with respect to the first section.

As best illustrated in FIGS. 2 and 5, combination mixing and dispersing assembly 30 comprises a first, lower section of subassembly 32 and a second, upper section or subassembly 34. Sludge delivery conduit 28 includes a flange 36 (FIG. 1) which is attached to a mating flange 38 (FIGS. 2, 4 and 5) by bolts (not shown) extending through holes 40 in the flanges.

Combination mixing and dispersing assembly 30 is supported within upper portions 16 of vessel 12 by a support assembly 42 supported by a plurality of legs 44 fastened in any conventional manner, such as by welding or with fasteners, to support plates 46 attached to the bottom wall of the vessel. A plurality of substantially horizontal supports 45 attached in a like manner to support plates 47 are also used to support the support assembly 42 as illustrated in FIG. 1.

To obtain efficient oxygenation of the sludge within vessel 12, the sludge is mixed substantially continuously. A suitable mixing means comprises a sludge mixing outlet 48 attached to a conduit 50. A pump 52, such as a hydraulically driven pump, pumps the sludge through conduit 50 into sludge mixing inlet 54 located in the lower portion of vessel 12.

Oxygen-rich gas, which may be oxygen, ozone or a mixture thereof, enters reactor vessel 12 through an inlet conduit 56 which may be controlled by a suitable remote controlled valve 58. Conduit 56 is connected to an internal gas inlet conduit 60 which in turn is connected by a flange 62 to a flange 64 of a connecting conduit 66. Connecting conduit 66 in turn is connected to a manifold 68, best illustrated in FIGS. 2 and 3.

Gas manifold 68 is connected by a plurality of fittings 70 to the first, lower section 32 of the combination gas and sludge mixing and dispersing assembly 30 in a manner described in more detail hereinafter. Each fitting is connected to be in gas communication between manifold 68 and a bore 72 formed in first section 32 which in turn communicates with one of a pluraltiy of channels 74 formed between first, lower section 32 and second, upper section 34 of the combination mixing and dispersing assembly. When oxygen-rich gas and sludge are pumped into combination gas and sludge mixing and dispersing assembly 30, the mixture of gas and sludge is dispersed from the mixing and dispersing assembly through the plurality of channels 74 in a plurality of streams of mixed oxygenated sludge 76. Sludge streams 76 are directed against a plurality of target areas preferably radially formed around the top wall of vessel 12. A plurality of target plates 78 may be secured to the inside of the top wall of the vessel by welding, for example. Sludge streams 76 impact with target plates 78 to form great numbers of sludge droplets 77 which are dispersed throughout upper portion 16 of hyperbaric vessel 12. By dispersing pre-oxygenated sludge throughout upper portion 16 of vessel 12, very efficient and substantially complete interaction of the oxygen-rich gas and sludge occurs over a relatively short period of time.

To allow purging of manifold 68 to remove solid or liquid particles which may settle in the manifold, a purging means is associated with the manifold. The purging means comprises a connecting conduit 80 connected to manifold 68, preferably at a location opposite that of the gas inlet connecting conduit 66. Conduit 80 is attached by a flange 82 to a flange 84 of an internal gas purging conduit 85 which in turn is connected to an external gas purging conduit 86. A remote controlled valve 87 is used to control the purging of the contaminated oxygen-rich gas from manifold 68 through external conduit 86.

Manifold 68 is supported by fittings 70 to combination mixing and dispersing assembly 30 which is supported within vessel 12 as described above. Additional support for the oxygen-rich gas delivery and purging components may be provided, if desired, by legs 88 attached at one end to conduits 60 and 80, for example, and at the other end to support plates 89 supported on the inside of the bottom wall of vessel 12, all as illustrated in FIG. 1.

A shaft 90 is attached to the second, upper section 34 of combination mixing and dispersing assembly 30 to raise and lower the second section with respect to the stationary first section 32. As illustrated in FIG. 1, shaft 90 passes through manhole opening 92. Surrounding the manhole opening is a raised neck 94 having a flange 96 to which is attached a cover 98. A packing gland 99 or other suitable device for maintaining pressure within hyperbaric vessel 12 is associated with cover 98 surrounding shaft 90. The opposite end of shaft 90 which is not connected to the second section of the mixing and dispersing assembly is connected to a piston (not shown) within a hydraulic cylinder 100 mounted on cover 98. Hydraulic lines 102 and 104 connected to a suitable source of hydraulic fluid (not shown) control the raising and lowering of shaft 90 and second section 34 with respect to first section 32 of combined mixing and dispersing assembly 30.

If desired, a plurality of site glasses or viewing ports 106 and 108, for example, may be included around vessel 12. The viewing ports may be illuminated as desired in a manner well known to those skilled in the art and may be located both in the upper portion and lower portion of the vessel.

A conduit 110 having a valve 112, representative of a gas outlet or bleed valve, may be located in the upper portion of the vessel, preferably in a top wall thereof. Likewise, a conduit 114 including a pressure sensor 115 and/or a safety pressure relief valve 116 also may be located in the upper portion of the vessel, and preferably at the top wall thereof.

The novel gas and sludge mixing and dispersing assembly 30 and related components will now be described in more detail with reference to FIGS. 2 through 7. As indicated above, combination mixing and dispersing assembly 30 comprises a first, lower section 32 and a second, upper section 34. First section 32 is best illustrated in FIGS. 2, 4, 5 and 6. First section 32 includes a generally cylindrical lower portion 118 integrally formed with an upper, inverted conical portion 120. First section 32 preferably is machined or cast from a single piece of material, such as stainless steel or other material which can withstand the acidic, corrosive environment within the vessel. A plurality of raised bosses 122, for example, five in the presently preferred embodiment, are arranged radially and equiangularly around the first section, toward the bottom of inverted conical portion 120.

A central bore 124 extends axially through both portions 118 and 120 of first section 32, as best illustrated in FIG. 4. A plurality of angled, generally semicircular lower channel halves 126 extend radially around first section 32. Lower channel halves 126 are best illustrated in the top plan view of FIG. 6 as having a larger cross-section where they join with the central bore 124 and a smaller cross-section at their opposite, upper end where they join with each of a plurality of upper channel halves 136 to form a nozzle or opening through which a mixture of oxygen-rich gas and sludge is dispersed in the form of a stream of droplets from assembly 30.

First, lower section 32 also includes a plurality of vertical V-shaped guideways 128 radially arranged around section 32 between adjacent channel halves 126. Because of the inverted conical shape of portion 120, guideways 128 may extend to and through the outside wall forming openings 129 as best illustrated in FIG. 2. The purpose of guideways 128 will become clear below after the structure of second, upper section 34 is described.

Figure 6:
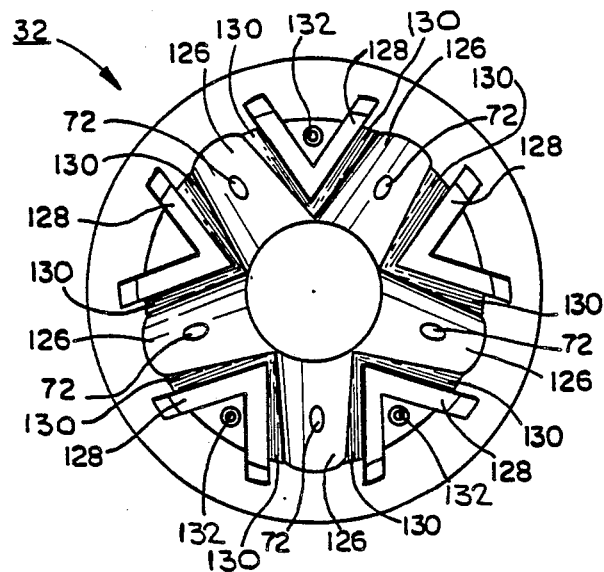
FIG. 6 is a top plan view of the first, lower section of the combination gas and sludge mixing and dispersing assembly.
Figure 7:
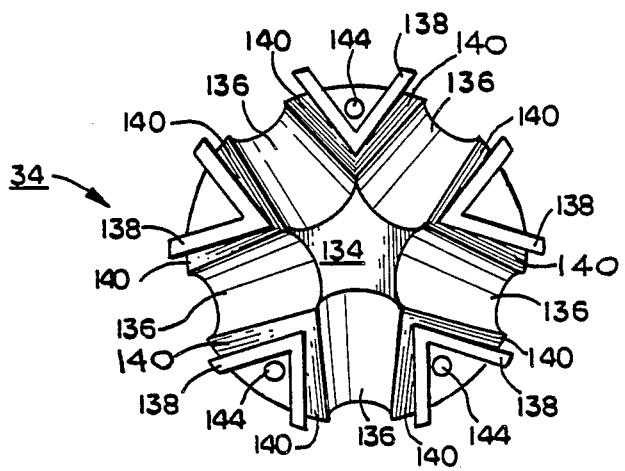
FIG. 7 is a bottom plan view of the second, upper section of the combination gas and sludge mixing and dispersing assembly.

As best illustrated in FIGS. 4 and 6, bores 72 join corresponding lower channel halves 126 so that the oxygen-rich gas from each of the bores 72 mixes intimately with the sludge from each of the channels 74. Bore 72 meets channel 74 at an oblique angle as best illustrated in FIG. 4. In view of this arrangement, the pressurized gas efficiently mixes with the sludge in the channel and helps propel the mixture of gas and sludge from mixing and dispersing assembly 30.

First section 32 also includes a plurality of machined, cast surfaces 130 which extend between lower channel halves 126 and guideways 128. Surfaces 130 mate with and adjoin complementary surfaces formed on second section 34. Additionally, a plurality of bores 132, preferably threaded, are formed in first section 32 to retain vertical guide rods 146 (see FIG. 4) in a manner and for the purpose referred to hereinafter.

Second, upper section 34 will now be described in more detail with particular reference to FIGS. 2 through 5 and 7. As best seen in FIG. 4 and in FIG. 7, a bottom plan view of section 34, the section is in the shape of an inverted cone and includes a bottom wall 134 which is illustrated as being flat (FIG. 4). If desired, bottom wall 134 could be tapered to a point or a flat or curved truncated point to provide a smoother flow of sludge through the combination mixing and dispersing assembly 30.

A plurality of upper channel halves 136 radially arranged around section 34 have a larger cross-sectional dimension at their lower end where they join with central bore 124 and a smaller cross-sectional dimension at their upper end where they cooperate with lower channel halves 126 to form a plurality of outlets or nozzles for channels 74.

Figure 3:
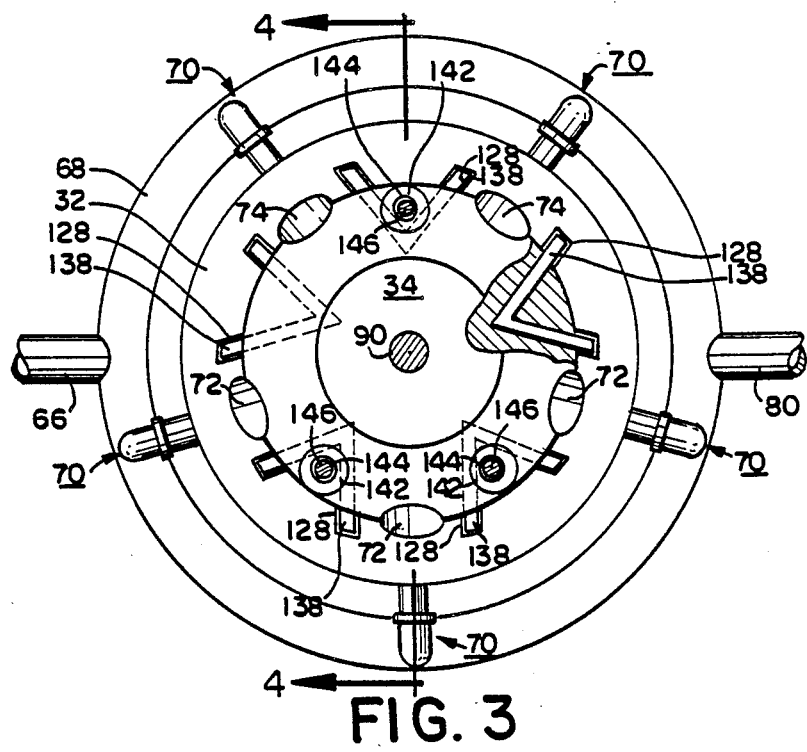
FIG. 3 is a top plan view, partly broken away, of the components of the present invention illustrated in FIG. 2.

A plurality of vertical, V-shaped guides 138 are cast or machined in the inverted conical surface of second section 34. Guides 138 travel within vertical, V-shaped guideways 128 formed in first, lower section 32 as best illustrated in FIGS. 2 and 3 and, especially, FIG. 5. The mating guides 138 and guideways 128 provide for proper alignment of lower channel halves 126 with upper channel halves 136.

As best illustrated in FIGS. 4 and 5, a plurality of machined, cast surfaces 140 extend between upper channel halves 136 and guides 138 to form surfaces for section 34 which abut complementary surfaces 130 of first section 32.

A plurality of raised bosses 142 are formed on the upper surface of second section 34. Guide rod bores 144 extend through raised bosses 142 completely through the second section and are aligned with threaded bores 132 formed in first section 32. Guide rod bores 144 have a slightly greater diameter than threaded bores 132 and guide rods 146 which extend through guide rod bores 144 and are threaded into threaded bores 132. Guide rods 146 maintain the proper alignment of the upper channel halves 136 with lower channel halves 126 when second section 34 is raised and lowered with respect to first section 32.

It is important to be able to raise and lower section 34 with respect to section 32. In the lowermost position illustrated in FIG. 4, where machined or cast surfaces 130 and 140 are in contact, channels 74 have their smallest diameter. Where the channels have their smallest diameter, the pressure of the mixture of oxygen-rich gas and sludge exiting from channels 74 is the greatest. However, due to the variable content and nature of sludge, it may be desirable to raise section 34 with respect to section 32 to allow for a greater volume of the gas-sludge mixture to be dispersed or, more commonly, to relieve blockages of the channels or to provide for cleaning of the combination mixing and dispersing assembly 30. Upper section 34 is raised by shaft 90 connected at one end by a threaded connection to a threaded bore 148 formed in section 34 and at the other end to the piston of hydraulic cylinder 100.

Fittings 70 connecting oxygen-rich gas manifold 68 to first section 32 will now be described in more detail with reference to FIGS. 2 and 4. Only one fitting will be described, since the others are substantially the same as the one described.

A connecting conduit 150 threaded at one end is welded, soldered or otherwise attached at the other end to manifold 68. The threaded end of conduit 150 is connected by a threaded connector 152 to a connecting conduit 154 threaded at both ends. Conduit 154 is connected by a threaded elbow 156 to another threaded conduit 158. Threaded conduit 158 is connected by a threaded elbow 160 to still another threaded conduit 162. Threaded conduit 162 is screwed into a threaded lower portion 164 of bore 72 in raised boss 122 formed in inverted conical portion 120 of first section 32.

It can be seen that the oxygen-rich gas readily passes from manifold 68 through fittings 70 to bores 72. At the juncture of the bores 72 and channels 74, the oxygen-rich gas is mixed with the sludge. Since the oxygen-rich gas is pressurized and the sludge is pumped into combination mixing and dispersing assembly 30 so that it is also pressurized, the mixed gas and sludge are forcibly dispersed from channels 74 with the outer portions of the channels acting as nozzles to disperse the pre-oxygenated sludge throughout the upper portion of vessel 12 in the form of a plurality of streams of droplets.

The operation of reactor assembly 10 will now be described with particular reference to FIG. 1.

To initiate operation, sludge, which preferably has been acidified by addition of sulfuric acid or other suitable acid to a pH of about 3.0 to about 4.5, and preferably, about 3.0 to about 3.5, is pumped into hyperbaric vessel 12 through sludge inlet 20. Pumping continues until the vessel is about half full to a level below the location of the combination mixing and dispersing assembly 30. The flow of oxygen-rich gas, which initially is preferably oxygen, is initiated through gas inlet 56, valve 58, conduits 60 and 66, manifold 68, fittings 70, bores 72 and channels 74. Sludge mixing pump 52 is activated to begin circulating and mixing the sludge in lower portion 18 of the vessel. Sludge delivery pump 26 is activated to pump sludge from lower portion 18 through the channels 74 of the combination gas and sludge mixing and dispersing assembly 30. Oxygen is added and mixed with the sludge in assembly 30 until the pressure within the vessel reaches an appropriate value of about 45 p.s.i.g. to about 65 p.s.i.g., and preferably, about 60 p.s.i.g. Oxygenation and dispersement of the sludge from the combination gas and sludge mixing and dispersing assembly causes a plurality of sludge streams 76 of the mixture to be dispersed against target plates 78 radially arranged on the upper wall of the vessel. Sludge streams 76 impact with target plates 78 to form great numbers of sludge droplets 77 which are dispersed throughout upper portion 16 of hyperbaric vessel 12.

Oxygenation continues for about 30 minutes at which time ozone is substituted for the oxygen. The ozone is generated by any one of a number of commercially available ozone generators (not shown). Ozone is added through the same gas delivery means as the oxygen for about 60 minutes. The desired pressure, about 60 p.s.i.g., is maintained in the upper portion of the hyperbaric vessel by opening bleed valve 112 where necessary. After the ozonation for about 60 minutes, the activation of sludge is complete.

Sludge mixing or recirculating pump 52 is then deactivated, as is sludge delivery pump 26. It is preferred that the activated, fully oxygenated sludge is released using the apparatus and process of Long, Jr. U.S. Pat. No. 4,695,388 by which a valve downstream of sludge outlet 21 is rapidly opened causing the rapid release of pressure which enhances the flotation of treated sludge in a separation apparatus (not shown).

It is believed that the treatment of the sludge with oxygen and ozone in the manner set forth above using the apparatus of the present invention will result in activated sludge in which the bacteria levels are within acceptable standards and preferably, below currently detectable amounts.

The parameters of operation will depend to some extent on the content and nature of the sludge being treated. It is well within the purview of those of ordinary skill in the art to adjust the parameters based on the disclosure provided herein to provide for the efficient oxygenation of sludge.

The present invention may be embodied in other specific forms without departing from the spirit or essential attributes thereof and, accordingly, reference should be made to the appended claims, rather than to the foregoing specification as indicating the scope of the invention.

What is claimed is:

1. Apparatus for use in a sewage treatment system comprising means to enhance the treatment of the sludge with oxygen-rich gas including

- a hyperbaric vessel having sludge inlet means for conveying the sludge to the vessel to be accumulated in a lower portion thereof,
- a combination mixing and dispersing means supported within an upper portion of the vessel for mixing the sludge and oxygen-rich gas and for dispersing a mixture of sludge and oxygen-rich gas throughout the upper portion of the vessel, the combination mixing and dispersing means comprising a first, lower section and a second, upper section, and having a plurality of channels radially arranged therethrough and extending from and between the first section and through and between the second section of the combination mixing and dispersing means,
- a sludge delivery means attached to the first section of the combination mixing and dispersing means for delivering sludge from the bottom portion of the vessel to the mixing and dispersing means,
- a gas delivery means for delivering oxygen-rich gas to the first section of the combination mixing and dispersing means, the gas delivery means having a plurality of conduits each in fluid communication with one of the channels,
- a sludge outlet means for removing the oxygenated sludge from the lower portion of the vessel, and
- gas outlet means for removing gas from the upper portion of the vessel.

2. The apparatus of claim 1 wherein the gas delivery means comprises an inlet conduit in fluid communication with a manifold, the manifold being in fluid communication with a plurality of conduits, each conduit delivering the oxygen-rich gas to one of the channels of the mixing and dispersing means.

3. The apparatus of claim 2 wherein each of the plurality of conduits is connected to a fitting on the first section of the combination mixing and dispersing means and each fitting is aligned with and connected to a bore formed in the first section where the bore extends to a respective channel.

4. The apparatus of claim 3 wherein the bore meets the channel at an oblique angle.

5. The apparatus of claim 2 further comprising a valved outlet conduit connected at one end to the manifold, the other end extending out of the vessel, for purging oxygen-rich gas and impurities from the manifold.

6. The apparatus of claim 1 further comprising a plurality of target areas within the upper portion of the vessel and located radially around an upper wall, the mixture of sludge and oxygen-rich gas being dispersed from the combination mixing and dispersing means so as to impact against the target areas.

7. The apparatus of claim 6 wherein the target areas are reinforced within the vessel.

8. The apparatus of claim 1 further comprising a sludge mixing means for mixing the sludge in the lower portion of the vessel.

9. The apparatus of claim 1 further comprising means for raising and lowering the second section of the combination mixing and dispersing means with respect to the first section of the combination mixing and dispersing means.

* * * * *